Nov. 5, 1957    G. CHERTOCK ET AL    2,811,984
THICK-EDGE DIAPHRAGM PRESSURE GAGE
Filed March 23, 1955

INVENTORS
GEORGE CHERTOCK
RICHARD W. MAYO

BY *George Sipkin*
*B. L. Zangwill*
ATTORNEYS

United States Patent Office 2,811,984
Patented Nov. 5, 1957

2,811,984

THICK-EDGE DIAPHRAGM PRESSURE GAGE

George Chertock, Silver Spring, Md., and
Richard W. Mayo, San Diego, Calif.

Application March 23, 1955, Serial No. 496,362

3 Claims. (Cl. 137—784)

(Granted under Title 35, U. S. Code (1952), sec. 266)

The invention described herein may be manufactured and used by or for the Government of the United States of America for governmental purposes without the payment of any royalties thereon or therefor.

This invention is directed to an improvement in underwater pressure gages and diaphragms therefor; and more particularly relates to gages and diaphragms therefor responsive to underwater pressures created by shock or similar disturbances of a type that accompany an explosion within a body of water.

The shock or pressure waves of an underwater exposion are of periodic form. Gages for obtaining a measure of these waves usually comprise a metallic diaphragm having one side subjected to air pressure and having its other side exposed to the shock wave so that the diaphragm is flexed or deflected in accordance with the varying pressures of the wave. Strain gages are secured to the inner or air-pressure side of the diaphragm for providing an electrical measure of the deflection of the diaphragm.

There are several considerations that must be taken into account in the design of a diaphragm for an underwater pressure gage to which this invention is directed. One consideration is the fundamental frequency of the diaphragm. This frequency should be several times higher than the highest frequency expected in the shock wave which is to be measured. A diaphragm with a high fundamental frequency can be obtained by making it as small as possible; but the practical problem of mounting the strain gages on it may be the determining factor in the size of the diaphragm. A second consideration in the design of the diaphragm is its sensitivity. Its sensitivity should be as high as is compatable with the frequency requirement so that the recording system attached to the strain gages will be relatively free of spurious vibrations or signals.

Gages of the prior art usually comprise a diaphragm consisting of a circular piece of metal clamped at its periphery and having a uniform thickness in any direction from its center to its circular edge. The natural frequency and the sensitivity of a diaphragm of a uniform thickness in an underwater pressure gage have been mathematically determined to be as follows:

$$f = \frac{Kh}{D^2}\sqrt{\frac{E}{p}}$$

$$S = \frac{Kd^2}{Eh^2}$$

In these formulae:

$f$ is frequency in cycles per second;
$S$ is sensitivity in micro inches for pounds pressure per square inch;
$k$ is a constant;
$h$ is thickness of the diaphragm in inches;
$d$ is the diameter of the diaphragm in inches;
$E$ is the modulus of elasticity of the material of the diaphragm; and
$e$ is the density of the material of the diaphragm.

Thus, it can be seen that the diameter and the thickness of a diaphragm of uniform thickness are dictated to a large extent by the frequency and sensitvity requirements of the observations.

In the use of gages of the type to which the invention pertains, a linear response is highly desirable for a predetermined range of deflection of the diaphragm. An important factor in determining the linear response from a gage having a circular diaphragm is the physical strains created in its material when it is flexed by pressure waves. These strains should not exceed the proportional limit of the material of the diaphragm. With a circular diaphragm of uniform thickness clamped at its edges, the strains at the edges will be slightly more than twice the radial strains at the center of the diaphragm, so that the proportional limit of the diaphragm-material is reached at the edges while the strain at the center is much below that limit. This means that although the center may respond linearly to still higher pressures, non-linearity is introduced because the strain at the edges are more or exceed the proportional limit of the diaphragm-material. The result is that the sensitivity is adversely affected.

It is further pointed out, that when a pressure is applied to one surface of a uniformly thick circular diaphragm, said diaphragm is deflected in such a manner that the central area of the other surface is in radial tension, while the peripheral area of said latter surface is in radial compression. The stress changes from tension to compression at a point closer to the periphery of the diaphragm than the center thereof.

In accordance with common practice one or more strain gages are bonded to that region of the diaphragm surface that will be in tension, and one or more strain gages are bonded to the same surface of the diaphragm in the area that will be in compression; said strain gages are then connected into a conventional, electrical bridge arrangement. By connecting together, in the bridge arangement, a strain gage adapted to be under tension, to one adapted to be under compression, maximum electrical sensitivity is obtained for a pressure detecting device of the type dealt with herein. See the patent to Ruge, Ser. No. 2,400,467 or the text entitled, "The Strain Gage Primer," Perry and Tissner, published 1955, McGraw-Hill, for further details of the conventional arrangement of strain gages described above.

It is however pointed out that, in the case of a uniformly thick diaphragm, the strain gage arrangement described above does not always result in maximum sensitivity, because a portion of each of the strain gages that is on the diaphragm area that is in compressive strain, may also overlap a portion of the area that is in tensile strain.

An object of the invention is to provide an improved diaphragm-type pressure gage of the type described which is more sensitive and more reliable than other gages of the same type.

A further object of the invention is to provide a pressure gage of the type described which has linear responsive characteristics through an exceptionally large range of pressure-variations on the diaphragm.

Still another object of the invention is to provide a pressure gage of a type described which has a diaphragm so designed that it is substantially equally stressed throughout its operative deflectable exposed area.

A further object of the invention is to provide an improved diaphragm for underwater pressure gages.

Still another object of the invention is to provide a pressure gage of the type described which is of simple construction, compact in design, reliable in operation, and easy to use.

In accordance with the invention, a gage is provided having a diaphragm with a minimum thickness at its center, the thickness however, increasing in a direction from the center of the diaphragm to its edge so that radial strains throughout the diaphragm are substantially the same for any deflection. This means that the sensitivity of the diaphragm, and hence of the gage, is determined by the diaphragm-deflection and not by the strains in the material at the edges of the diaphragm. A diaphragm with this new and advantageous characteristic is obtained, in accordance with the invention, by having its thickness increase smoothly as the distance from the center to the edge increases. Such a diaphragm has considerably more sensitivity of linear response than a diaphragm having a uniform thickness of a dimension corresponding to that of the greatest thickness of the improved diaphragm, considering only the pressure-responsive parts of the diaphragm. The new diaphragm can be operated at pressures approximating twice that at which a uniformly thick diaphragm can be operated. A further advantage of a diaphragm in accordance with the invention reside in the fact that it has a higher natural frequency than a similar diaphragm of uniform thickness and equal sensitivity.

In addition to the novel features described, a diaphragm in accordance with the invention should be made of a material which is highly resistant to corrosion by sea water. Several metals can be used such as, for example, stainless steel, Monel metal, beryllium copper, and titanium. These metals provide the following desirable characteristics for use as a diaphragm in an underwater pressure gage: (1) they provide a linear and undistorted response to any of the static or dynamic pressures within the range being measured; (2) they have an extremely high ratio of proportional limit of material to modulus of elasticity of material; (3) they have a high ratio of modulus elasticity to density; (4) they have a high resistance to dynamic or fatigue failure; and (5) they are easy to machine.

Other objects and many of the attendant advantages of this invention will be readily appreciated as the same becomes better understood by reference to the following detailed description when considered in connection with the accompanying drawing wherein.

Figure 1:
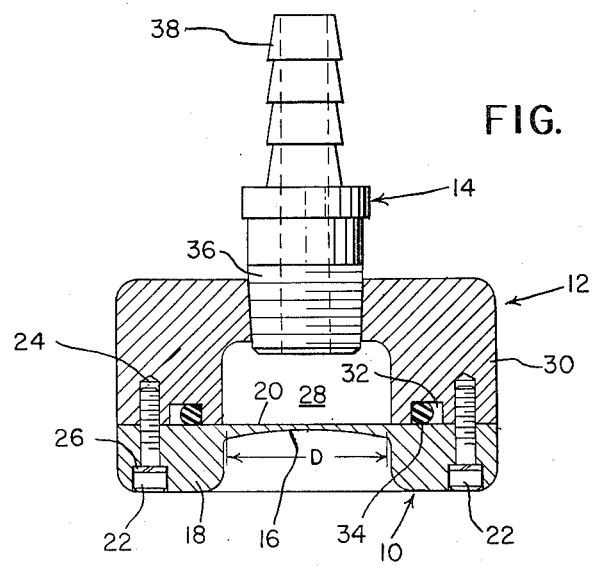
Fig. 1 is a view, partly in section, of a pressure gage embodying principles of the invention, but with electrical components omitted for clarity, these components being conventional.

As shown in the drawing, a pressure gage in accordance with the invention comprises, as principal parts, a circular diaphragm 10, a circular gage body 12, and a longitudinally hollow electrical cable connector 14. The gage body 12 serves as a mounting for the diaphragm 10 and connector 14. In use, a plurality of strain gages are placed on the inner surface of the diaphragm and are connected by wires to conductors that pass longitudinally through the cable connector 14.

The diaphragm 10 is a single piece of metal comprising a central deflectable pressure-receiving portion 16 and a thick annular outer portion 18 around the pressure-receiving portion 16. The inner surface 20 of the diaphragm extends over its entire expanse and is circular and flat. The thickness of the deflectable portion 16 varies smoothly from a minimum at its center to a maximum at the area where it merges smoothly into the annular portion 18. The effective diameter of portion 16 is shown as dimension D.

The annular portion 18 of the diaphragm 10 is provided with a plurality of spaced, smooth holes for receiving screws 22 that screw into correspondingly spaced holes 24 in the gage body 12. The holes in the diaphragm are countersunk so that the heads of the screws 22 are below or inward of the outer surface of the annular portion 20 of the diaphragm. Lock washers 26 may be provided for the screws.

The gage body 12 is of one piece of metal and comprises a hollow space 28 defined in part of a thick annular portion 30 having a flat face adapted to rest flush against the diaphragm face 20. This space 28 is partially occupied by the strain gages and lead off conductors that usually are part of a complete gage for measurements. The tapped holes 24 for screws 22 are in the annular portion 30 of the gage body 12.

In general, the diaphragm 10 is made of one of the metals aforementioned, either stainless steel or Monel being preferred. In a particular embodiment, the cable connector was made of brass and the screws, gage body and diaphragm of stainless steel. Preferably for sea water use, the stainless steel is passivated.

In this gage, the maximum outer diameter of the gage body and diaphragm was two and one-fourth inches; and the diameter D was almost one-inch. The inner cylindrical wall of the body portion corresponding to 30 was in line with the corresponding inner wall of the associated diaphragm portion and both were of one inch diameter. The gage body 12 also has an annular indentation 32 that receives a rubber O-ring 34 for assuring a water tight joint between the gage body and the diaphragm. The gage body 12, in addition to serving as a diaphragm mounting, serves as a cover for the strain gages on the diaphragm and as a receptacle for electrical connections leading from the strain gages and out through the electrical cable connector 14. To this end the base of the gage body 12 was a central hole that is tapped for a pipe-thread fitting.

The electrical cable connector 14 comprises a securing portion 36 and an angularly indented hose- or sheath-receiving portion 38. The portion 36 fits into the central hole of the gage body 12 and to this end has a tapered lower section provided with a pipe thread. The pipe thread between the cable connector and the gage body provides a water tight fit between them.

In use, a cable sheath of a cable having lead-in conductors passing through the cable connector 14, fits tightly over the receiving portion 38 of the connector. The lead-in conductors are joined with short jumpers and soldered joints to wires from the strain gages, preferably four of them connected as a bridge. A resin or other waterproofing compound is poured into the void between and around the lead-in conductors inside the cable connector to effect a watertight seal and to prevent the conductors from pushing into the case.

The outer diameter can, for all practical purposes, be considered to be the diameter of the deflectable portion of the diaphragm. Four small strain gages approximately 1/8 inch by 1/4 inch were mounted on this portion.

In order to obtain substantially equal strains at the center and edges of the diaphragm, its thickness should increase regularly in a predetermined way from the center point radially to an edge. This shape can be represented by the equation $$h = h_0 e^{4\left(\frac{x}{D}\right)^2}$$

where $h$ is the thickness at a point $x$ distance radially from the center of the diaphragm of a diameter $D$, $e$ is the base of natural logarithms or about 2.718, and $h_0$ is the thickness at the center.

Figures 2, 3:
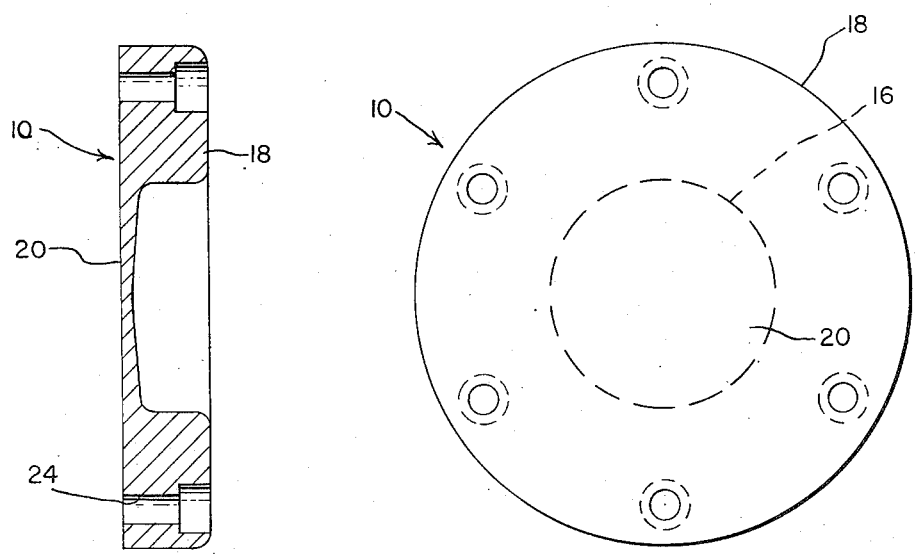
Fig. 2 is a plan view of the diaphragm.
Fig. 3 is a sectional view of a modified form of diaphragm.

While this particular shape gives practically equal radial stresses at the center and edges, other shapes can be used to give a similar result. The diaphragm can have a straight line sloping from its center. A typical curve would be $$h = h_0 + \frac{2x}{D} M h_0$$

where M is constant above 1 to about 1.718, preferably close to the latter. In such a diaphragm, however, the center should be rounded, to avoid sharp discontinuities, as shown in Fig. 3. Sharp discontinuities introduces errors and high strains. Incidentally, the edges of diaphragms should similarly be smoothly merged into the thicker outer portion 18.

In an actual embodiment as shown in Figs. 1 and 2 as already mentioned having a diaphragm with a deflectable portion of one inch diameter thicknesses at the center of .022 to .048 inch have been utilized. (In Fig. 1, this minimum thickness has been shown exaggerated for clarity of illustration.) The utilizable pressure ranges for a gage with a .022 inch minimum thickness diaphragm is about 0 to 616 p. s. i., and with a .048 inch diaphragm about 0 to 3000 p. s. i.; when the diaphragm material is stainless steel known as CRES–14, having a proportional limit of approximately 60,000 to 70,000 p. s. i.

The upper limit of usable range is defined as that pressure causing a radial strain at the center of the diaphragm of 2500 micro inches per inch. The natural frequencies of the diaphragms in water range from the order of 10,000 C. P. S. to 21,000 C. P. S. The pressures to which the gage is subjected in water make the slight variation in air pressure on the flat surface of the diaphragm comparatively insignificant so that exceptional care in the assembly of the gage and this connection is unnecessary.

Sensitivity is defined as the signal voltage per unit pressure for a fixed bridge voltage on the strain gages arranged in a Wheatstone bridge circuit. The sensitivity of gages with diaphragms shown in Fig. 1 having thicknesses from 22 mils at the center to 48 mils at the center, range from $10.4 \times 10^{-6}$ per p. s. i. to $2.06 \times 10^{-6}$ per p. s. i.

The maximum scatter of non-linearity was in the order of 2 to 3% and the return to zero was accurate within one percent of full scale deflection on the electrical indicating instrument. The diaphragm deflected uniformly for uniform changes of pressure, and repeated its indications under duplicate conditions of pressure.

It is pointed out that a diaphragm of the type shown in Fig. 1, wherein the thickness $h$ varies according to the equation $$h = h_0 e^{4\left(\frac{x}{D}\right)^2}$$

will, when deflected, have a relatively greater area in compression than will a diaphragm of uniform thickness. This feature of the applicants' diaphragm serves to provide more space for the strain gages that are adapted to be bonded to the compressive region of the diaphragm surface in the manner described above. Thus the situation described above, in connection with a uniformly thick diaphragm, wherein a strain gage is in both compression and tension is prevented, thereby rendering the applicants' pressure gage more sensitive than one having a pressure-deflectable diaphragm of uniform thickness.

Obviously many modifications and variations of the present invention are possible in the light of the above teachings. It is therefore to be understood that within the scope of the appended claims the invention may be practiced otherwise than as specifically described.

What is claimed is:

1. A pressure responsive gage for measuring underwater shock waves comprising, a hollow gage body having an outer wall and having a base wall, a diaphragm having an outer portion and an inner, circular, pressure-deflectable portion, said outer portion being contiguous to and thicker than said inner portion, said inner portion having a minimum thickness at its center and gradually increasing in thickness in a direction radially outward therefrom for a distance substantially to said outer portion, the thickness, $h$, of the diaphragm at points radially outward from the center following the curve $$h = h_0 e^{4\left(\frac{x}{D}\right)^2}$$

where $h_0$ is the thickness at the center, $e$ is the natural base number, D is the diameter of the circular deflectable portion, and $x$ is the radial distance from the center; and means securing said outer portion to said outer wall.

2. A circular diaphragm for a shock-wave-responsive pressure gage comprising a pressure-deflectable portion having a minimum thickness at its center and gradually increasing in thickness in a direction radially outward therefrom, said diaphragm being characterized by the thickness, $h$, of the diaphragm at points radially outward from the center following the curve $$h = h_0 e^{4\left(\frac{x}{D}\right)^2}$$

where $h_0$ is the thickness at the center, $e$ is the natural base number, D is the diameter of the circular deflectable portion, and $x$ is the radial distance from the center.

3. A diaphragm as defined in claim 2 but further characterized by one surface of said deflectable portion being planar.

References Cited in the file of this patent
UNITED STATES PATENTS

| | | |
|---|---|---|
| 1,708,938 | Crandall et al. | Apr. 16, 1929 |
| 2,019,495 | Kallmeyer | Nov. 5, 1935 |
| 2,202,900 | Draper | June 4, 1940 |
| 2,580,407 | Clark | Jan. 1, 1952 |
| 2,715,717 | Keithley et al. | Aug. 16, 1955 |